United States Patent
Ligon

(10) Patent No.: US 6,409,351 B1
(45) Date of Patent: Jun. 25, 2002

(54) SPHERICAL IMAGE PROJECTION SYSTEM USING A CONVEX REFLECTING IMAGE DISPERSING ELEMENT

(76) Inventor: Thomas R. Ligon, 2938 N. Madison, Loveland, CO (US) 80538

(*) Notice: Subject to any disclaimer, the term of this patent is extended or adjusted under 35 U.S.C. 154(b) by 0 days.

(21) Appl. No.: 09/781,935

(22) Filed: Feb. 12, 2001

(51) Int. Cl.[7] ............................................. G03B 21/28
(52) U.S. Cl. ........................................... 353/98; 353/99
(58) Field of Search ........................ 353/98, 99, 79, 353/46, 50, 51, 122, 28; 434/285, 286, 44

(56) References Cited

U.S. PATENT DOCUMENTS

| | | |
|---|---|---|
| 2,510,080 A * | 6/1950 | Cuneo ........................ 353/98 |
| 2,592,444 A | 4/1952 | Matelena |
| 3,586,432 A | 6/1971 | Pentes, Jr. |
| 4,427,274 A | 1/1984 | Pund et al. |
| 4,859,053 A | 8/1989 | Nicolas |
| 5,762,413 A * | 6/1998 | Colucci et al. ............. 353/122 |
| 6,042,238 A * | 3/2000 | Blackham et al. ............ 353/94 |
| 6,286,962 B1 * | 9/2001 | Hennes et al. ................ 353/94 |

* cited by examiner

Primary Examiner—William Dowling
(74) Attorney, Agent, or Firm—Daniel J. Bedell; Smith-Hill and Bedell

(57) ABSTRACT

A projection system employs a convex reflecting mirror to disperse a projected image onto the inner surface of a screen enclosing a spherical or other three-dimensional space. When the screen is a spherical, translucent rear-projection screen, the projection system produces a display of substantially spherical form viewable from outside the enclosed space. When the screen is opaque and of spherical or other three-dimensional form, the projection system produces a three-dimensional image surrounding a viewer.

24 Claims, 3 Drawing Sheets

Figure 4:
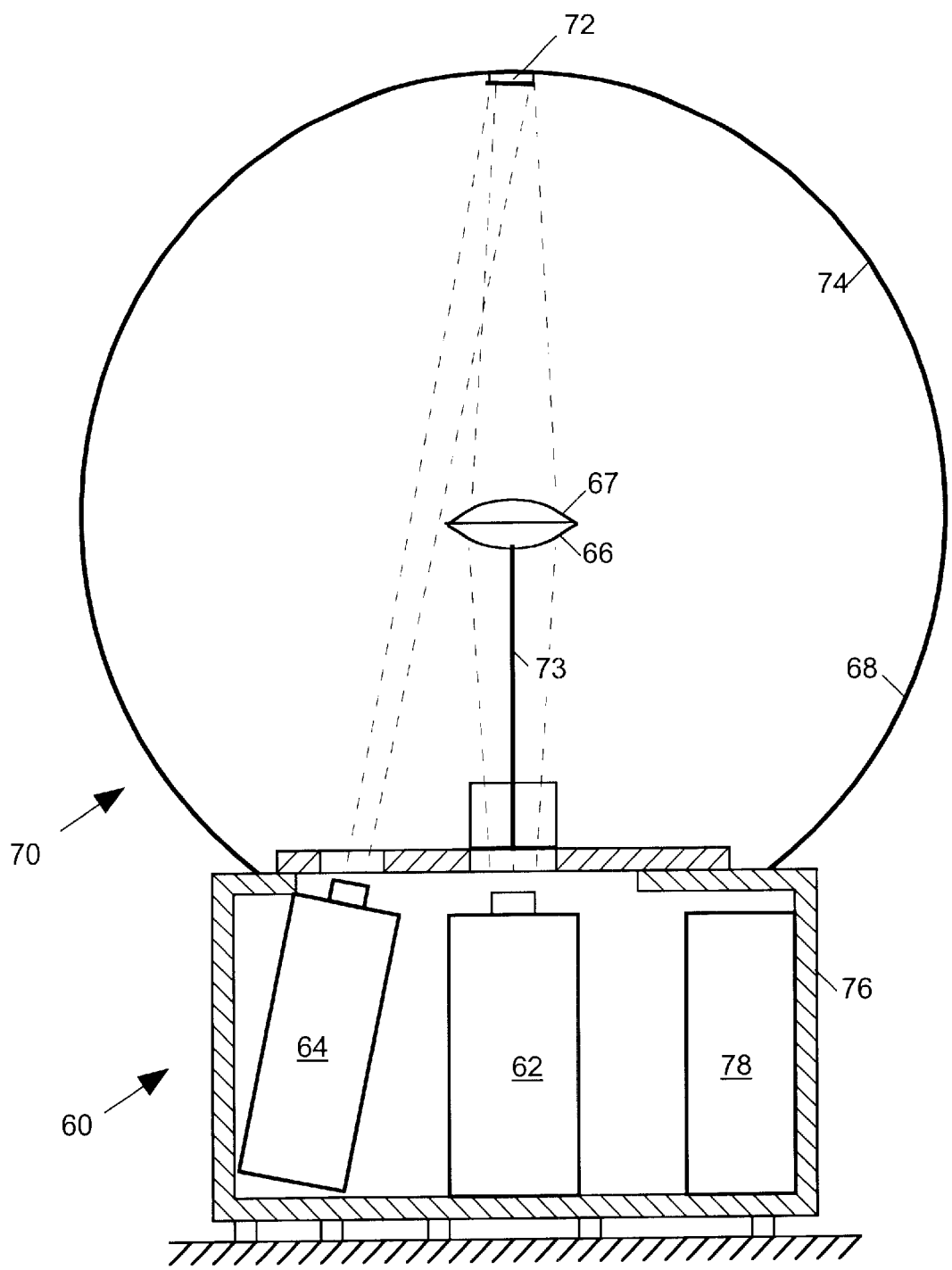

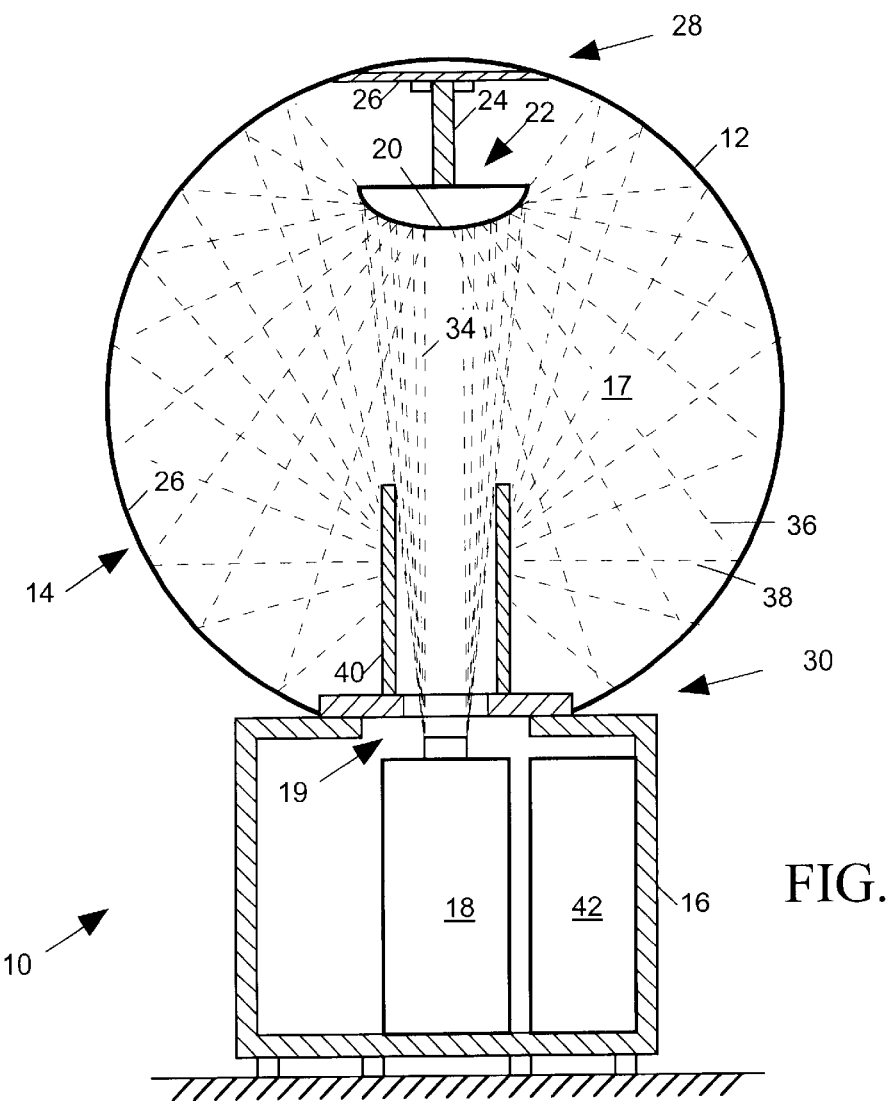
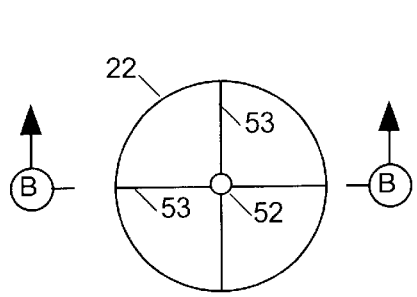
FIG. 2
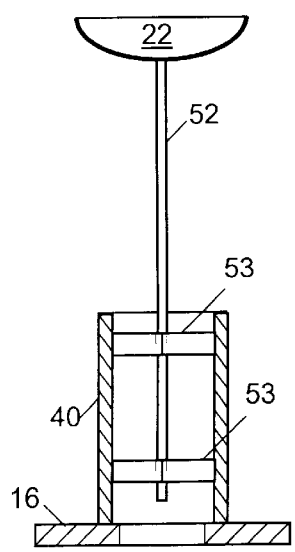
FIG. 3

SPHERICAL IMAGE PROJECTION SYSTEM USING A CONVEX REFLECTING IMAGE DISPERSING ELEMENT

BACKGROUND OF THE INVENTION

1. Field of the Invention

The present invention relates in general to wide angle projection display systems and in particular to an apparatus for displaying an image over most of the surface of a spherical or other three-dimensional screen.

2. Description of Related Art

A rear projection system projects an image onto a rear surface of a translucent screen to produce a display on the front surface of the screen. Various prior art projection systems produce displays on a spherical, hemispherical or other three- dimensional rear-projection screens. U.S. Pat. No. 2,592,444 issued Apr. 8, 1952 to Matelena describes an apparatus employing a projector having two opposed lens mounted inside a sphere for projecting images onto opposing sides of the sphere. The sphere is formed of translucent material so that the image appears on the outer surface of the sphere. U.S. Pat. No. 3,586,432 issued Apr. 1, 1969 to Pentes describes a system employing a set of three projectors mounted inside a translucent sphere. Both of these systems provide only very limited coverage of the full spherical screen and have the added difficulty of access to the projectors mounted inside the sphere.

It is known to employ a projector having a "fisheye" lens to directly project a display on a hemispherical screen, however a single such a projector cannot distribute an image over a spherical screen. U.S. Pat. No. 4,859,053 issued Aug. 22, 1989 to Nicolas describes a system for producing an image on a hemispherical portion of a sphere. A projector positioned outside the sphere projects the image onto the inner side of a translucent hemisphere of the sphere through an aperture in a side of the sphere opposite the translucent hemisphere. This system provides easy access to the projector, but it only produces an image on a hemispherical screen.

U.S. Pat. No. 4,427,274 describes a front-projection system employing two projectors positioned external to a sphere for projecting images through apertures on opposite sides of the sphere onto inner surfaces on opposing hemispheres. A rear projection system employing similar principles could produce a display over most of the surface of a spherical rear-projection screen. However such a system employing externally mounted projectors at opposite ends of the sphere which would detract from the appearance of the display. A system employing an externally mounted projector(s) at only one end of a sphere would be aesthetically preferable.

All of the above system can produce "ghost images" if a portion of an image to be projected outward from the screen surface is reflected inward from the inner surface and falls onto another portion of the inner surface of the sphere.

What is needed is a rear-projection system capable of producing a display over most of the outer surface of a sphere resting on a base, which requires projection equipment mounted only within the base and which suppresses ghost images.

BRIEF SUMMARY OF THE INVENTION

A projection system in accordance with the invention produces a display on a front-projection or a rear-projection screen having an inner surface substantially enclosing a three-dimensional space. The projection system employs a convex mirror positioned within the three-dimensional space to reflect an image produced by a projector. The mirror disperses the image over the inner surface of the screen. When the screen is formed of translucent material, the image appears on the screen's outer surface so that it may be viewed from outside the enclosed spaced. When the screen's inner surface is opaque, the image may be viewed on the screen's inner surface from within the three-dimensional space. Images produced by the projector may be appropriately pre-distorted to compensate for any distortion caused by the screen and dispersing mirror geometry so that they appear correctly when projected on the screen.

One embodiment of the invention employs a spherical translucent screen residing on a base containing a projector which projects an image through an aperture in the screen. A convex mirror mounted within the enclosed three-dimensional space disperses the projected image by reflecting it over most of the inner surface of the rear-projection screen, thereby producing a rear-projected image over most of the outer surface of the sphere. Only two relatively small regions of the screen lying along the axis of projection are obscured. A non-reflective baffle may be mounted within the sphere to absorb reflections from the sphere's inner surface to prevent ghost images.

An alternative embodiment of the invention employs two projectors mounted within the base, each of which projects a separate image into the space enclosed by the screen. A convex lower surface of a first mirror mounted near the center of the space reflects the image from the first projector onto a lower half of the inner surface of the screen. A second mirror mounted near the top of the space in opposition to the base reflects the image produced by the second projector onto a second convex reflector mounted near the center of the space and oriented upward which in turn reflects that image over the upper half of the inner surface of the screen. The two projector version produces a brighter display with more image detail than the single projector version of the display system.

Other embodiments of the invention employ one or more convex mirrors to disperse images from one or more projectors over inner surfaces of hemispherical screens.

It is accordingly an object of the invention to provide a system for producing a display over most of the surface of a three-dimensional screen, most particularly a spherical rear projection screen.

The claims portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

Figure 5:
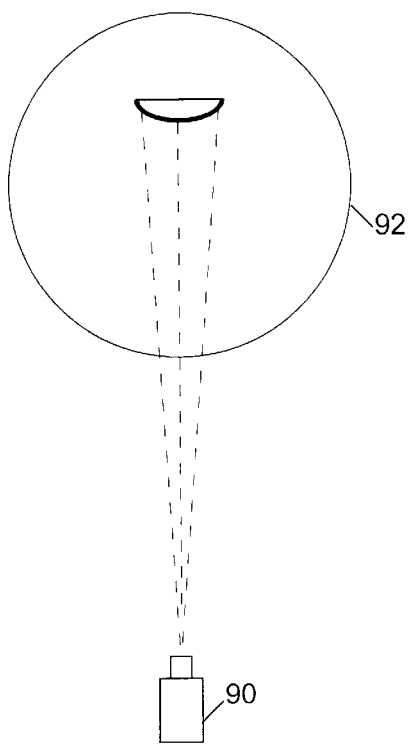
Figure 6:
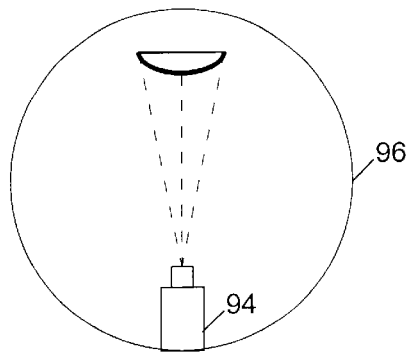

FIG. 1 is a sectional elevation view of a system in accordance with the invention employing a single projector for producing an image on a surface of a three-dimensional screen, FIG. 2 is a plan view of an alternative system for mounting the mirror of FIG. 1, FIG. 3 is a sectional elevation view of the alternative mirror mounting system of FIG. 2, FIG. 4 is a sectional elevation view of an alternative embodiment of a projection system in accordance with the invention employing two projectors to produce an image on an outer surface of a three-dimensional screen, and FIGS. 5 and 6 are simplified sectional elevation views of alternative embodiments of a single-projector system in accordance with the invention for producing an image on a surface of a spherical screen.

Figure 7:
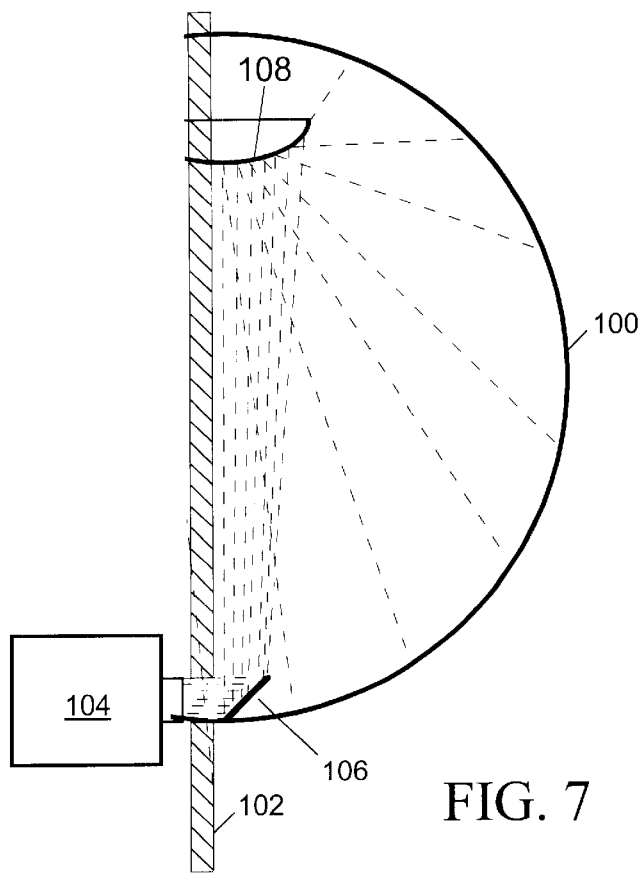
Figure 8:
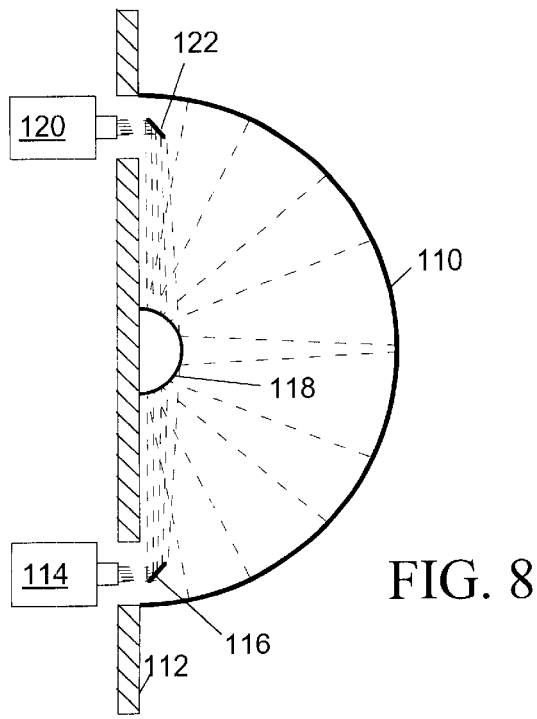

FIG. 7 is a simplified sectional elevation view of a single-projector system in accordance with the invention for producing an image on a surface of a hemispherical screen, and FIG. 8 is a simplified sectional elevation view of a dual-projector system in accordance with the invention for producing an image on a surface of a hemispherical screen.

DETAILED DESCRIPTION OF THE INVENTION

FIG. 1 is a sectional elevation view of a system 10 in accordance with the invention employing a single projector for producing an image on an outer surface 12 of a three-dimensional screen 14 suitably in the form of a hollow sphere substantially enclosing a spherical space 17. Screen 14 rests on a base 16. A projector 18 within base 16 projects an image upward through an aperture 19 in screen 14 and onto a lower surface 20 of a mirror 22 suspended on a rod 24 extending downward from a mounting plate 26 attached to screen 14. Projector 18, aperture 19 and mirror 22 lie along a common axis of screen 14. The convex lower surface 20 of mirror 22 reflects the projected image, dispersing it over most of the inner surface 26 of screen 14. Since screen 14 is translucent, the image appears over most of the outer surface 12 of the screen except at regions 28 and 30 along the axis of projection obscured by mirror 22 or base 16. When system 10 is sufficiently tall, a human standing next to the screen would not notice a gap in the image at upper region 28. The surface of convex mirror 22 may be of spherical or ellipsoidal geometry. A spherical mirror used in connection with a projector lens having a convex virtual focal surface or an ellipsoidal mirror used in connection with a projector having a flat virtual focal surface provide suitably deep focus for a sharp image display everywhere it appears on screen 14. When necessary the images produced by projector 18 may be appropriately pre-distorted to compensate for any distortion arising out of the screen and dispersing mirror geometry so that the image appears correctly when projected on screen 14.

FIG. 1 illustrates the paths 34 projected light follows from projector 18 to mirror lower surface 20 and paths 36 reflected light follows from mirror lower surface 20 to screen inner surface 26. If the inner surface of the screen has a slightly reflective finish, a small portion of the light striking screen inner surface 26 will be reflected and will not pass outward though the translucent material of the screen. Most of the reflected light follows paths 38 to a dark cylindrical baffle 40 extending upward from base 16 toward mirror 22 and surrounding the light beam emanating from projector 18. Baffle 40 absorbs light reflected from inner surface 26 to prevent that light from reaching other parts of the screen's inner surface and creating ghost images.

Projector 18 may be a film, digital or any other kind of projector for producing still or moving images. In the embodiment of the invention illustrated in FIG. 1, projector 18 is a digital projector for producing images based on video data provided by a computer 42 also mounted within base 16. Doors (not shown) in base 16 provide easy access to projector 18 and computer 42.

FIG. 2 is a plan view and FIG. 3 is a sectional elevation view of an alternative system for mounting mirror 22 of FIG. 1. Rather than suspending mirror 22 on a rod 24 extending down from a plate 26 mounted on the inner surface 26 of screen 14 as in FIG. 1, the alternative mounting system illustrated FIGS. 2 and 3 employs a central rod 52 rising upward from baffle 40 to support mirror 22 from below. The supporting rod 52 is itself supported from thin fins 53 within baffle 40 aligned to minimize obstruction of the projected light.

FIG. 4 illustrates a projection system 60 similar in many respects to system 10 of FIG. 1 including a translucent spherical screen 70 resting on a base 76. However projection system 60 employs two projectors 62 and 64 within base 76 instead of one to provide a brighter display. A convex lower surface of a mirror 66, supported by a central rod 73 extending upward from base 76, distributes the light beam from projector 62 primarily over the inner surface of lower hemisphere 68 of screen 70. A second mirror 72 attached to the inner surface of the top of screen 70 is tilted to reflect the light beam from projector 64 onto a convex surface of an upward-directed third mirror 67 which distributes the image primarily over the inner surface of the upper hemisphere of screen 70. Projector 62, and mirrors 66, 67 and 72 lie along the vertical axis of the space enclosed by screen 70 while projector 64 is offset from that axis and directs its beam along a path intersecting the vertical axis at mirror 72. In the preferred embodiment projectors 62 and 64 are digital projectors controlled by a computer 78 within base 76. However projectors 62 and 64 may be any kind of projector.

Since ghost images are reflected back towards the central mirrors 66 and 67, they are less problematic for the two-projector version of FIG. 4. Thus no baffles similar in function to baffle 40 are included in the two-projector version of the system. However it should be apparent that baffles suitably shaped, positioned and sized to intercept light reflected from the inner surface of screen 70 could be provided to reduce ghosting.

FIG. 5 is a simplified sectional elevation view of an embodiment of the invention having optics generally similar to those of the single projection system 10 of FIG. 1 except that a projector 90 is positioned remote from a spherical screen 92 rather than being mounted in a base proximate to the screen. Screen 92 may be translucent or opaque depending on whether the image is to be viewed from inside or outside the space enclosed by screen 92.

FIG. 6 is a simplified sectional elevation view of an embodiment of the invention having generally similar optics to those of the single projection system 10 of FIG. 1 except that a projector 94 is positioned within a spherical screen 96 rather than external to it. Screen 96 may be translucent or opaque depending on whether the image is to be viewed from inside or outside the space enclosed by screen 96.

FIG. 7 is a simplified sectional elevation view of an embodiment of the invention for producing a display on an outer surface of a translucent hemispherical screen 100 mounted on a wall 102. A projector 104 embedded in wall 102 behind screen 100 projects an image onto a mirror 106 inside screen 100. Mirror 106 reflects the image onto a convex mirror 108 mounted on wall 102 which disperses the image over the inner surface of translucent screen 100 so that the image appears on its outer surface.

FIG. 8 is a simplified sectional elevation view of another embodiment of the invention for producing a display on the outer surface of a translucent hemispherical screen 110 mounted on a wall 112. A projector 114 embedded in wall 112 behind a lower end of screen 110 projects an image onto a mirror 116 inside screen 100. Mirror 106 reflects the image onto a convex mirror 118 mounted on wall 112 which disperses the image over the lower half of the inner surface of screen 110. Another projector 120 embedded in wall 112 behind an upper end of screen 110 projects a second image onto a mirror 122 which reflects the image onto mirror 118. Mirror 124 disperses the second image over the upper half of the inner surface of screen 110. The two projectors of FIG. 8 combined with convex mirror 118 to provide a brighter and more detailed image on hemispherical screen 110 than that provided by the single-projector hemispherical system of FIG. 7. It should be apparent that two or more projectors may be directed towards a single convex mirror or pair of such mirrors to combine the benefits of multiple projectors for brightness and detail.

Thus has been shown and described preferred embodiments of a system employing a convex dispersing mirror to reflect and disperse images from one or more projectors over most of the inner surface of a spherical or hemispherical screen that may be either translucent or opaque. The convex reflector arrangements permit an image to cover most of the surface of the screen even when projector(s) are positioned only at one end of the screen.

While the forgoing specification has described preferred embodiment(s) of the present invention, one skilled in the art may make many modifications to the preferred embodiment without departing from the invention in its broader aspects. For example a similar system could be employed to project images on three-dimensional screens having other shapes, for example cylinders and polyhedrons. The appended claims therefore are intended to cover all such modifications as fall within the true scope and spirit of the invention.

What is claimed is:

1. An apparatus for displaying images, the apparatus comprising:
   a screen having an inner surface substantially enclosing a three-dimensional space;
   first projection means for projecting a first image; and
   a first mirror having a first convex surface positioned within the three-dimensional space for reflecting and dispersing the first image projected by the first projection means onto the inner surface of the screen.

2. The apparatus in accordance with claim 1 wherein the three-dimensional space is substantially spherical.

3. The apparatus in accordance with claim 1 wherein the first convex surface is one of ellipsoidal or spherical geometry.

4. The apparatus in accordance with claim 1 wherein the screen has an outer surface and is formed of translucent material such that the first image dispersed onto the inner surface of the screen appears on the outer surface of the screen.

5. The apparatus in accordance with claim 2 further comprising a base attached to the screen and substantially enclosing the first projection means.

6. The apparatus in accordance with claim 4
   wherein the three-dimensional space is substantially spherical, and
   wherein the first convex surface is one of ellipsoidal or spherical geometry.

7. The apparatus in accordance with claim 1 wherein the screen is substantially opaque.

8. The apparatus in accordance with claim 1
   wherein the screen has an aperture,
   wherein the first projection means resides outside the substantially enclosed three-dimensional space, and
   wherein the first projection means projects the first image through the aperture in the screen and onto the first convex surface of the first mirror.

9. The apparatus in accordance with claim 1
   wherein the first projection means resides substantially within the three-dimensional space.

10. The apparatus in accordance with claim 1 wherein the three-dimensional space is substantially spherical.

11. The apparatus in accordance with claim 1
    wherein the screen forms a hollow sphere having a central axis, and
    wherein the first projection means and the first mirror and lie along the central axis.

12. The apparatus in accordance with claim 1 further comprising a light baffle positioned within the three-dimensional space and surrounding a portion of a path the first image follows between the first projection means and the first mirror for absorbing light reflected by the inner surface of the screen.

13. The apparatus in accordance with claim 1 further comprising:
    second projection means for projecting a second image; and
    a second mirror having a second convex surface positioned within the three-dimensional space;
    a third mirror mounted within the substantially enclosed three-dimensional space for reflecting the second image projected by the second projection means onto the second convex surface of the second mirror,
    wherein the second mirror is positioned for reflecting and dispersing the second image onto the inner surface of the screen.

14. The apparatus in accordance with claim 13 wherein the first image is reflected and dispersed onto one half of the inner surface of the screen and the second image is reflected and dispersed onto another half of the translucent screen.

15. The apparatus in accordance with claim 14 wherein the screen is substantially spherical.

16. The apparatus in accordance with claim 15 wherein the screen has an outer surface and is formed of translucent material such that the first and second images dispersed onto the inner surface of the screen appear on the outer surface of the screen.

17. The apparatus in accordance with claim 16 further comprising a base substantially enclosing the first and second projection means, the screen being supported by the base and having at least one aperture through which the first and second projectors project the first and second images.

18. The apparatus in accordance with claim 17
    wherein the three-dimensional space is substantially spherical having a central axis,
    wherein the first projection means, the first mirror and the second mirror lie along the central axis, with the first mirror residing between the first projection means and the second mirror, and
    wherein the second projection means directs the second image along a path intersecting the central axis.

19. An apparatus for displaying images, the apparatus comprising:
    a substantially hemispherical screen having an inner surface defining a substantially hemispherical space;
    a first mirror positioned within the hemispherical space;
    first projection means for projecting a first image onto the first mirror such that the first mirror reflects the first image;
    a second mirror having a first convex surface positioned within the hemisphere for reflecting and dispersing the first image reflected by the first mirror onto the inner surface of the screen.

20. The apparatus in accordance with claim 19 wherein the first convex surface is one of ellipsoidal or spherical geometry.

21. The apparatus in accordance with claim 19 wherein the hemispherical screen has an outer surface and is formed of translucent material such that the first image reflected and dispersed onto the inner surface of the screen appears on the outer surface of the screen.

22. The apparatus in accordance with claim 19 further comprising:

second projection means for projecting a second image;

a third mirror positioned within the hemispherical space for reflecting the second image projected by the projection means; and a fourth mirror having a second convex surface positioned within the hemisphere for reflecting and dispersing the second image reflected by the third mirror onto the inner surface of the screen.

23. The apparatus in accordance with claim 22 wherein the first image is reflected and dispersed onto one half of the inner surface of the screen and the second image is reflected and dispersed onto another half of the screen.

24. The apparatus in accordance with claim 22 wherein the screen has an outer surface and is formed of translucent material such that the first and second images dispersed onto the inner surface of the screen appear on the outer surface of the screen.

\* \* \* \* \*